(12) United States Patent
Saddoughi et al.

(10) Patent No.: US 8,038,397 B2
(45) Date of Patent: Oct. 18, 2011

(54) SYSTEM AND METHOD OF DEICING AND PREVENTION OR DELAY OF FLOW SEPARATION OVER WIND TURBINE BLADES

(75) Inventors: Seyed Gholamali Saddoughi, Clifton Park, NY (US); Bruce John Badding, Ballston Lake, NY (US); Philippe Giguere, Simpsonville, SC (US); Matthew Patrick Boespflug, Clifton Park, NY (US); Grover Andrew Bennett, Jr., Schenectady, NY (US); Anurag Gupta, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/719,958

(22) Filed: Mar. 9, 2010

(65) Prior Publication Data

US 2011/0135467 A1    Jun. 9, 2011

(51) Int. Cl.
*F01P 7/06* (2006.01)

(52) U.S. Cl. ............................. 416/39; 416/61

(58) Field of Classification Search .................. 415/914; 416/1, 39, 61
See application file for complete search history.

(56) References Cited

U.S. PATENT DOCUMENTS

| 6,145,787 | A | * | 11/2000 | Rolls | 244/134 R |
|---|---|---|---|---|---|
| 7,380,756 | B1 | | 6/2008 | Enloe et al. | |
| 2007/0089795 | A1 | * | 4/2007 | Jacob | 137/827 |

OTHER PUBLICATIONS

Sorian, "Sense. Predict. Control", Jan. 2009, 3000 Kent Ave., West Lafayette, IN 47906, (765) 588-3527.

* cited by examiner

*Primary Examiner* — Edward Look
*Assistant Examiner* — Dwayne J White
(74) *Attorney, Agent, or Firm* — Ann M. Agosti

(57) ABSTRACT

A system for deicing a wind turbine blade includes an electrically powered active plasma actuator applied to a desired portion of a wind turbine blade. The activated plasma actuator energizes the air in the vicinity of the plasma actuator to increase the surface temperature of the wind turbine blade in the vicinity of the plasma actuator sufficiently to reduce or eliminate the collection of ice on a desired portion of the wind turbine blade.

15 Claims, 7 Drawing Sheets

SYSTEM AND METHOD OF DEICING AND PREVENTION OR DELAY OF FLOW SEPARATION OVER WIND TURBINE BLADES

BACKGROUND

The invention relates generally to wind turbines, and more specifically to use of a plasma actuator that operates without an external source of air other than ambient air to modify wind turbine boundary layer separation to energize retarded flows and to reduce the collection of ice over wind turbine blades.

Boundary layer separation takes place over highly curved surfaces for flows at high-angles of attack. This characteristic contributes to loss of pressure and hence a decline in aerodynamic efficiency of a wind turbine. In cold areas, collection of ice on the wind turbine blades not only contributes to loss of pressure, but also is hazardous.

Different techniques have been employed to modify the boundary layer interaction to control flow characteristics. Many of these well known techniques use passive methods and devices, while some others use piezo electric surface modifications for flow control. One known technique employs Dielectric Bather Discharge (DBD) devices to modify boundary layer interaction to control flow characteristics associated with an air induction system for an aircraft. Another known technique employs surface cavities to modify the boundary layer growth to mitigate flow losses.

Currently, there are no techniques used to overcome boundary-layer separation and simultaneously deice wind turbine blades. Vortex generators have been used to passively delay flow separation; but a major disadvantage to this solution is the vortex generator enhanced flow, even in situations where delaying flow separation is no longer desired.

In view of the foregoing, it would be advantageous to provide a method to actively control flow separation and deice wind turbine blades. The method would employ a plasma actuator that is compact with no exposed moving parts, that operates without an external source of air other than ambient air, that requires little power to operate, that provides more versatility than passive techniques, and that can be applied to existing devices such as, without limitation, fan blades and turbine blades, with only minor modifications(s).

BRIEF DESCRIPTION

Briefly, in accordance with one embodiment of the invention, a method of deicing a wind turbine blade comprises applying an active plasma actuator to a desired portion of the wind turbine blade, and electrically energizing the plasma actuator to ionize the air in the vicinity of the plasma actuator such that the surface temperature of the wind turbine blade in the vicinity of the plasma actuator is increased sufficiently to reduce or eliminate the collection of ice on the desired portion of the wind turbine blade.

According to another embodiment, a system for deicing a wind turbine blade comprises an active plasma actuator applied to a desired portion of the wind turbine blade. An electrical power supply energizes the plasma actuator such that the air in the vicinity of the plasma actuator is ionized to increase the surface temperature of the wind turbine blade in the vicinity of the plasma actuator sufficiently to reduce or eliminate the collection of ice on a desired portion of the wind turbine blade.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The embodiments described herein with reference to the figures are directed to methods for controlling boundary layer separation and collection of ice on wind-turbine blades using an active plasma actuator. An active plasma actuator is a device that uses electricity to ionize air. The gradient in electric field results in a body force which acts on the external flow and imparts momentum to the fluid particles. It can also provide a surface temperature increase, which can be controlled by adjusting the operation frequency of the device. The plasma actuator device applications described herein can advantageously modify the boundary layer separation through ionization of air to mitigate flow losses and increase the surface temperature to enhance deicing of wind-turbine blades, among other things.

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable. The modifier "about" used in connection with a quantity is inclusive of the stated value and has the meaning dictated by the context (e.g., includes the degree of error associated with measurement of the particular quantity).

Figure 1:
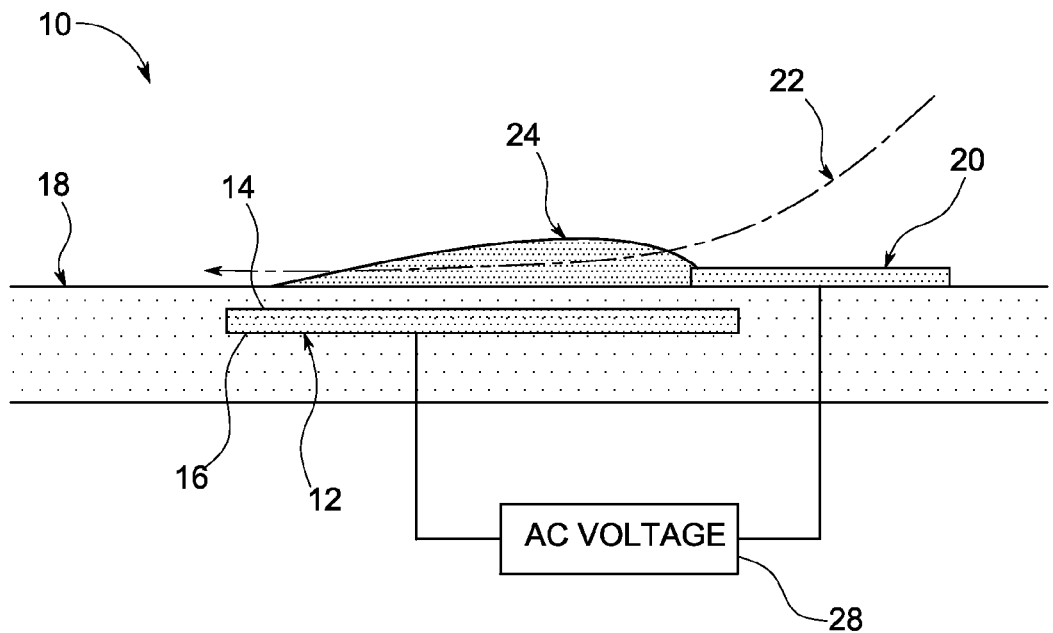
FIG. 1 is a cross-sectional view of an actively controlled plasma actuator for controlling boundary-layer separation and wind-turbine blade deicing.

FIG. 1 is a cross-sectional view of an actively controlled plasma actuator 10 for controlling boundary-layer separation and wind-turbine blade deicing according to one embodiment. Plasma actuator 10 comprises a base electrode 12 that may be, for example, and without limitation, a copper foil, having a top planar surface 14 and a bottom planar surface 16. A suitable insulating layer may be, for example, without limitation, a Kapton film, that is attached to or disposed atop the top planar surface 14 of the base electrode 12. A second electrode 20, that may also be, without limitation, a copper foil, may be attached to or disposed atop the insulating layer opposite the top planar surface 14 of base electrode 12. According to another embodiment, the base electrode 12 may be embedded within a desired portion of a wind turbine blade 18, while the second electrode 20 may be attached or disposed on a desired outer surface portion of the wind turbine blade 18, such as depicted in FIG. 1.

According to one embodiment, plasma actuator 10 advantageously can be manufactured as a tape that can be attached to a desired surface such as the surface of a wind turbine blade 18. Once attached to the surface of the wind turbine blade, plasma actuator 10 operates to energize retarded flows and simultaneously reduce the collection of ice over the surface of the wind turbine blade 18. Plasma actuator 10 thus negates the efficiency decline associated with loss of pressure and ice collection on wind turbine blades.

With continued reference to FIG. 1, airflow 22 having a high angle of attack relative to the curved surface of a wind turbine blade is ionized via the active plasma actuator 10. Active plasma actuator 10 is energized via an electrical power source 28. The resultant gradient in electric field 24 yields a body force, which acts on the external flow 22 and imparts momentum to the fluid particles to energize retarded flows and modify wind turbine boundary layer separation. The gradient in electric field 24 also results in a surface temperature, which can be controlled by adjusting the operation frequency of the device 10 for wind turbine blade applications. This feature advantageously promotes deicing of wind turbine blades and inhibits collection of ice on wind turbine blades in cold regions that may otherwise cause loss of pressure and reduced wind turbine efficiency.

In summary explanation, boundary layer separation takes place over highly curved surfaces for flows at high-angles of attack. This contributes to loss of pressure and hence a decline in aerodynamic efficiency of a wind turbine, while collection of ice on wind turbine blades in cold areas also results in hazardous wind turbine operating conditions. An actively controlled plasma actuator 10 is provided for simultaneously controlling boundary-layer separation and wind-turbine blade deicing. The plasma actuator 10 is manufactured according to one embodiment, in the form of a tape, similar to electrical tape that can be applied to a desired portion of a curved surface, such as a portion of a wind turbine blade. The plasma actuator 10 operates in the absence of an external source of air such as air jets or air stream generators, other than ambient air and has no exposed moving parts. Because the actuator 10 can be manufactured as a tape that can be attached to the blade surface(s), each operation can be conducted on demand. Thus, wind turbine blades can be designed to have reduced surface area, and thus reduced extreme loads during parked conditions.

Figure 2:
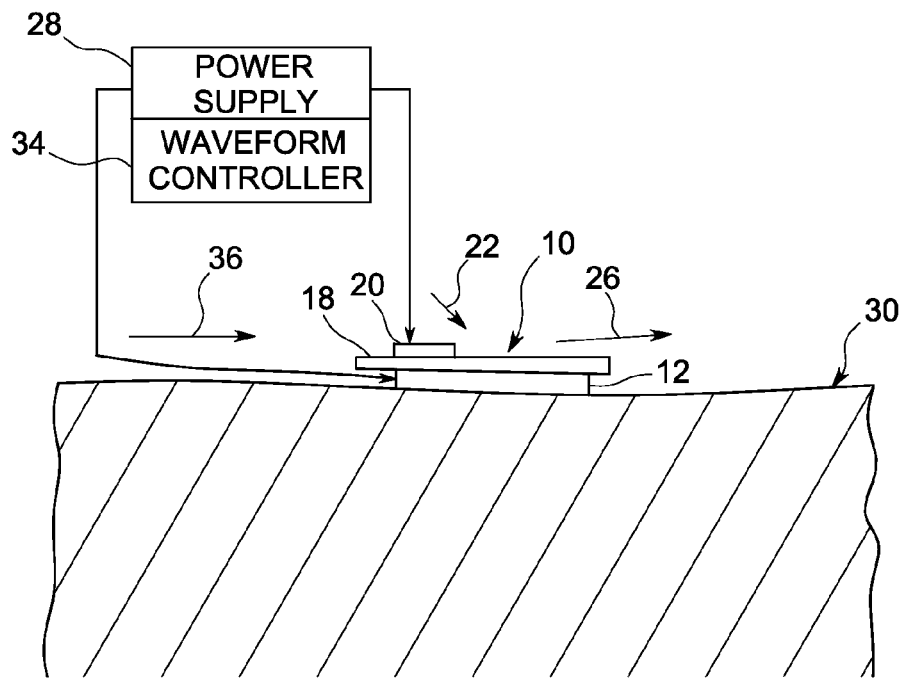
FIG. 2 illustrates the actively controlled plasma actuator illustrated in FIG. 1 configured as a tape that is applied to an airfoil surface according to one embodiment of the invention.

FIG. 2 illustrates the actively controlled plasma actuator 10 illustrated in FIG. 1 configured as a tape that is applied to an airfoil surface 30 such as a wind turbine blade surface, according to one embodiment of the invention. Plasma actuator 10 may have a thickness of about 1 mm according to one embodiment when manufactured as a tape.

Plasma actuator 10 may be connected to a power source 28 including a waveform controller 34 that is configured to control an input voltage level and pulsing, variable or AC voltage frequency, duty cycle and shape, such that air located in the electric field region enumerated 24 in FIG. 1 is ionized in a desired fashion to create a region of discharge plasma. In this manner, the plasma actuator 10 exerts a force upon the ionized particles capable of changing the path of motion of the particles against other forces, such as inertia, which tends to maintain the particles in their normal path. Air flow represented by arrows 22 and 26 is thus energized with increased momentum in a near-surface region such that flow separation can be delayed or prevented. If the flow has, for example, been previously separated, it can be re-attached.

Simultaneously, the gradient in electric field enumerated 24 in FIG. 1, results in a surface temperature increase, which can be controlled by adjusting the operation frequency of the device 10 for wind turbine blade applications, to promote deicing of wind turbine blades and/or inhibit collection of ice on wind turbine blades in cold regions that may otherwise cause loss of pressure and reduced wind turbine efficiency, as stated herein.

With continued reference to FIG. 2, an orientation of a plasma actuator 10 is defined herein as the direction in which it imparts momentum. The plasma actuator 10 in one embodiment is oriented to impart momentum generally parallel with the direction of flow 36 and accelerate the boundary layer in the near-surface region, although momentum can be added in any direction parallel to the surface in which plasma actuator 10 is attached.

Figure 3:
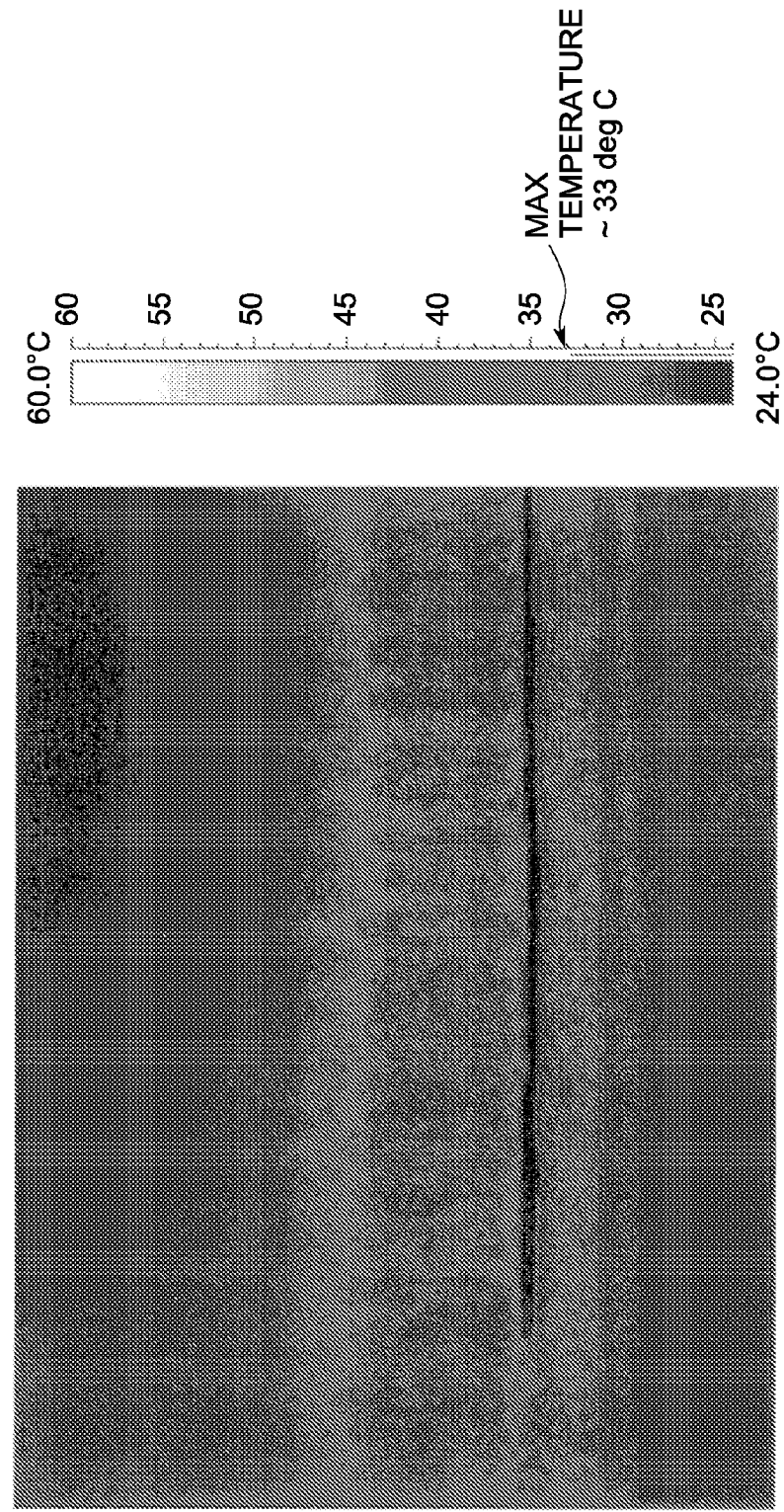
FIG. 3 illustrates a top view Infra Red (IR) image of a plasma actuator temperature distribution along the surface of the plasma actuator during operation at about 5 KHz for a period of 3 seconds.

FIG. 3 illustrates a top view Infra Red (IR) image of a plasma actuator temperature distribution along the surface of the plasma actuator during operation at about 5 KHz for a period of 3 seconds.

Figure 4:
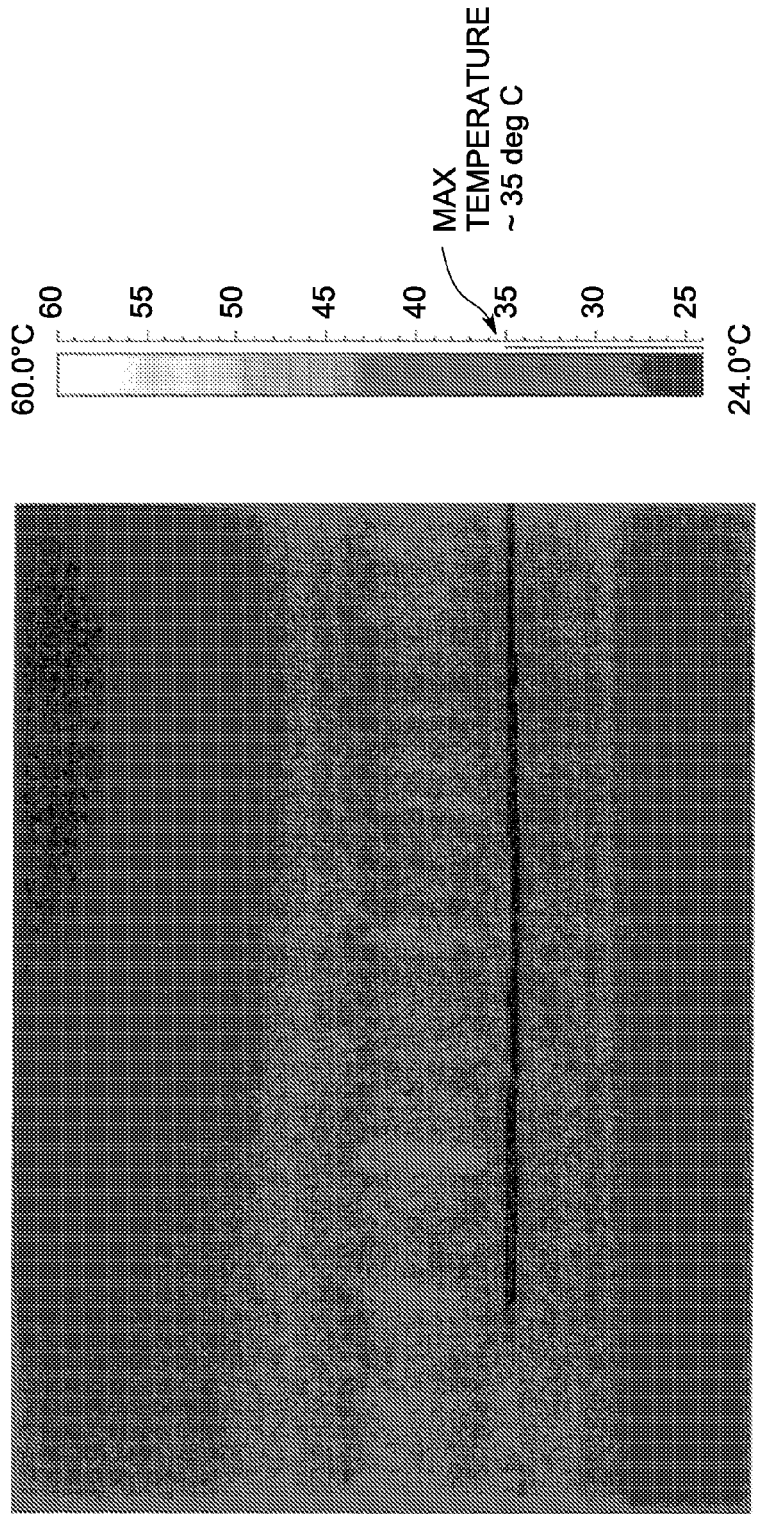
FIG. 4 illustrates a top view IR image of a plasma actuator temperature distribution along the surface of the plasma actuator during operation at about 5 KHz for a period of 4 seconds.

FIG. 4 illustrates a top view IR image of a plasma actuator temperature distribution along the surface of the plasma actuator during operation at about 5 KHz for a period of 4 seconds.

Figure 5:
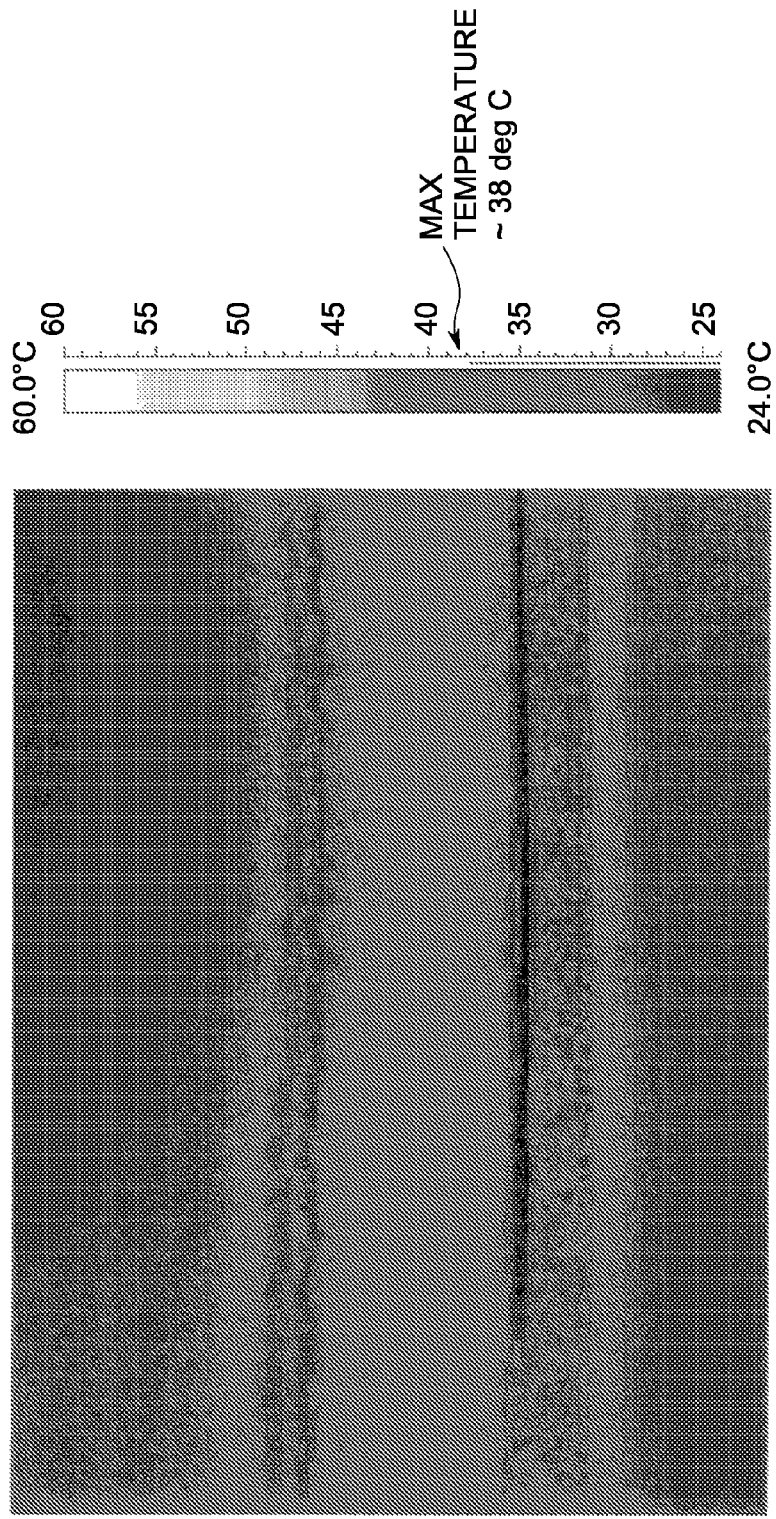
FIG. 5 illustrates a top view IR image of a plasma actuator temperature distribution along the surface of the plasma actuator during operation at about 5 KHz for a period of 7 seconds.

FIG. 5 illustrates a top view IR image of a plasma actuator temperature distribution along the surface of the plasma actuator during operation at about 5 KHz for a period of 7 seconds.

A fairly uniform temperature distribution can be seen along the surface of the plasma actuator. The maximum temperature obtained is approximately 38 degree Celsius after 7 seconds of operation of the actuator at the 5 KHz operating frequency.

Figure 6:
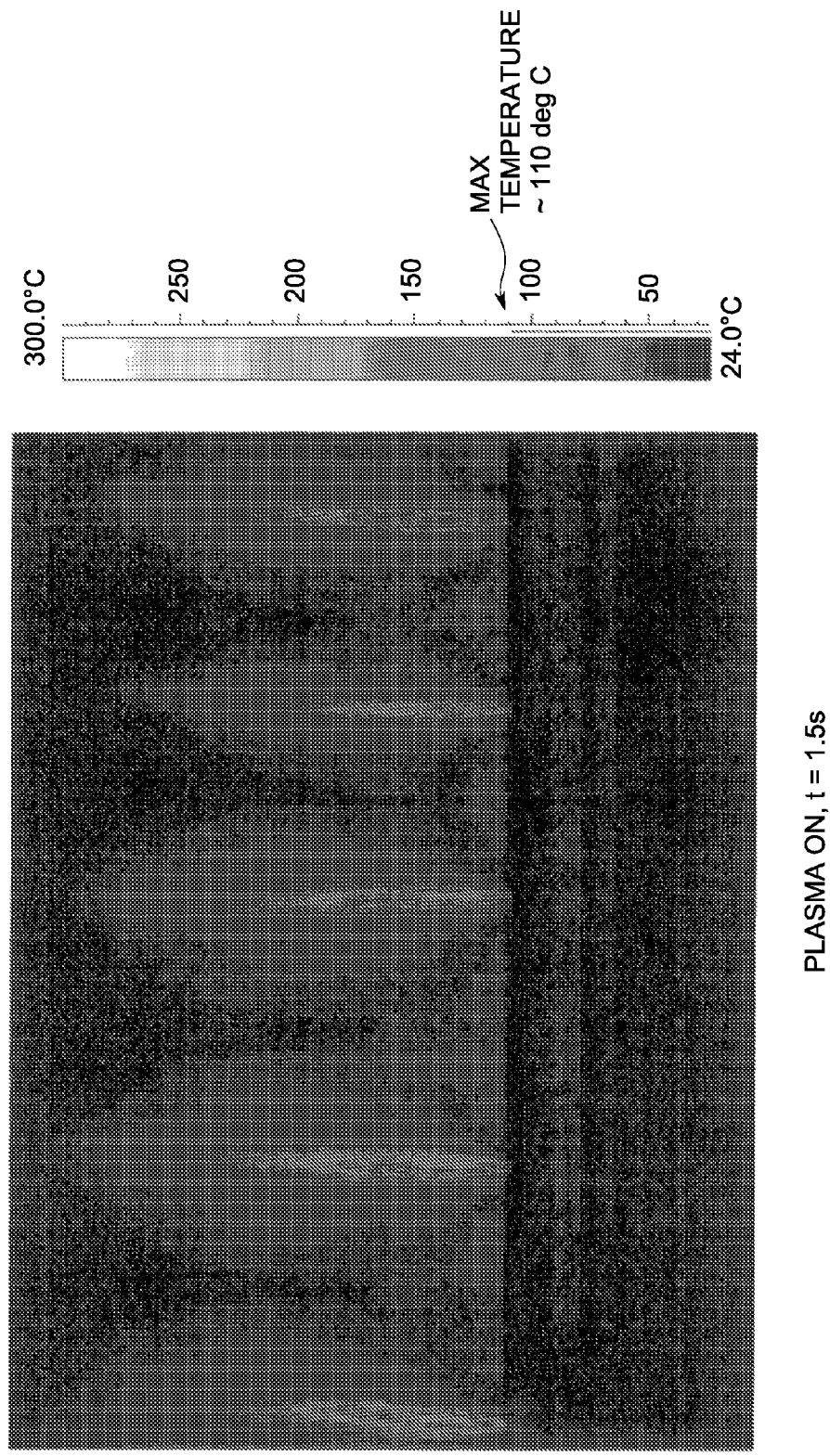
FIG. 6 illustrates a top view IR image of a plasma actuator temperature distribution along the surface of the plasma actuator during operation at about 25 KHz for a period of 1.5 seconds.

FIG. 6 illustrates a top view IR image of a plasma actuator temperature distribution along the surface of the plasma actuator during operation at about 25 KHz for a period of 1.5 seconds.

Figure 7:
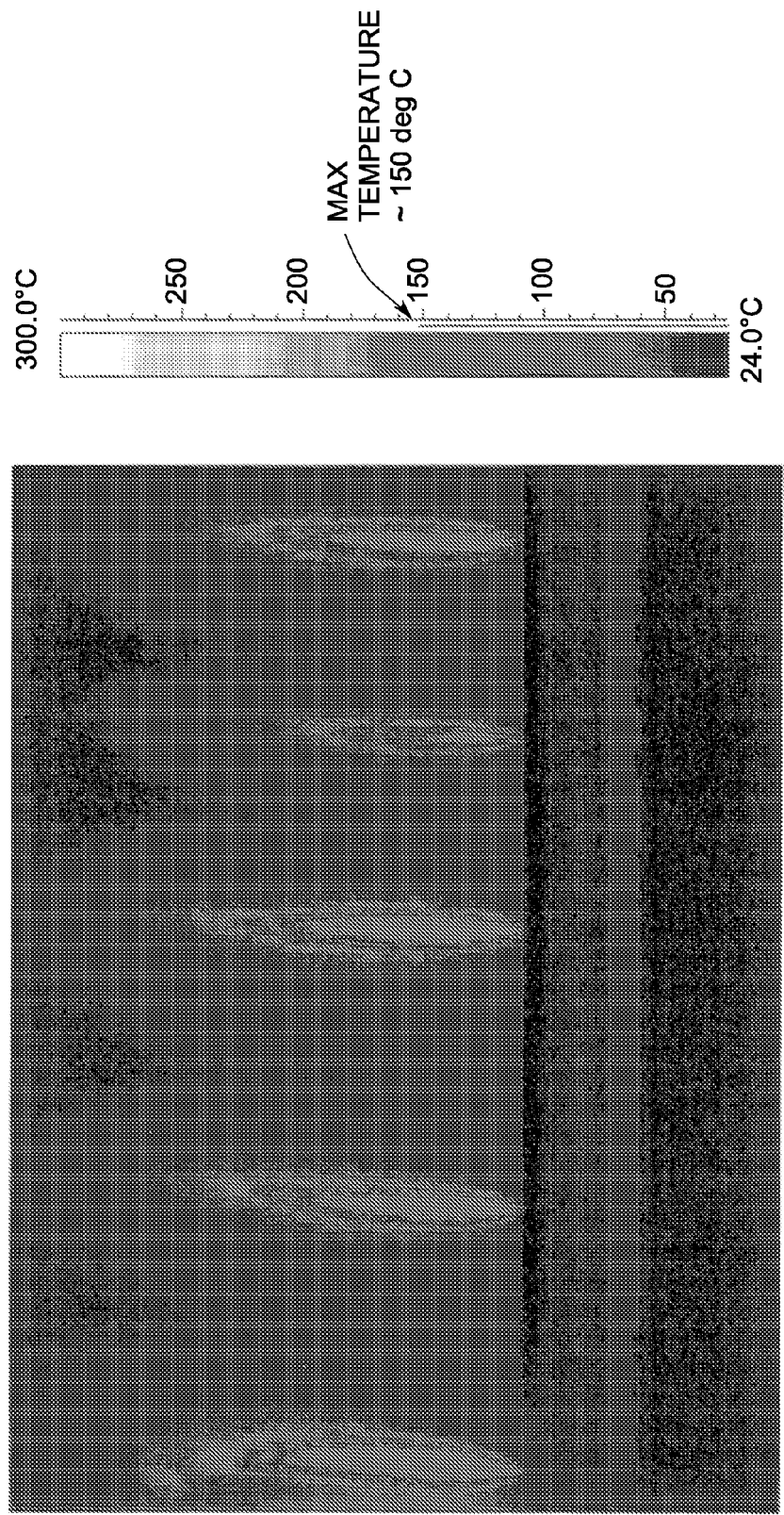
FIG. 7 illustrates a top view IR image of a plasma actuator temperature distribution along the surface of the plasma actuator during operation at about 25 KHz for a period of 3.5 seconds.

FIG. 7 illustrates a top view IR image of a plasma actuator temperature distribution along the surface of the plasma actuator during operation at about 25 KHz for a period of 3.5 seconds.

Figure 8:
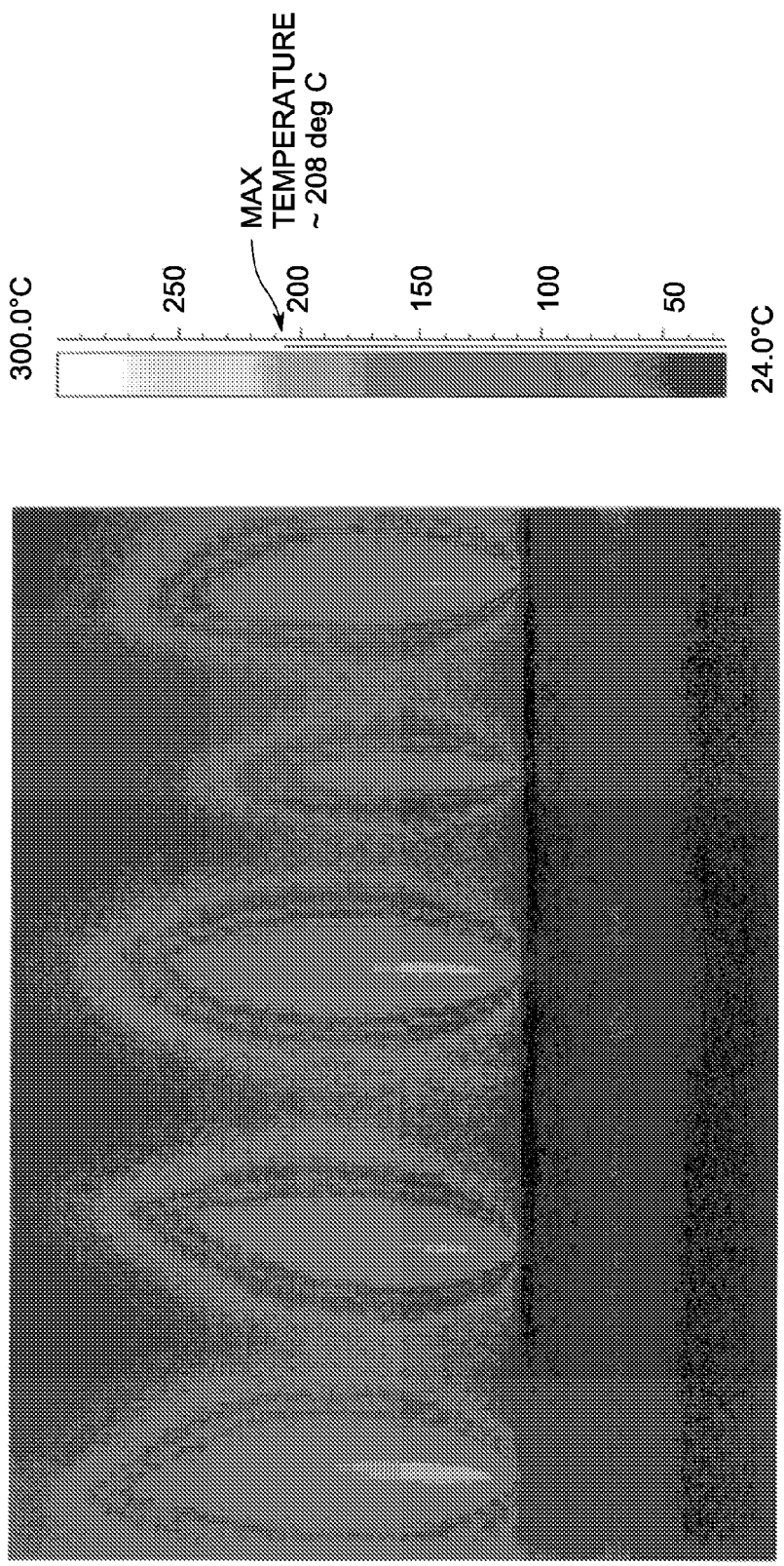
FIG. 8 illustrates a top view IR image of a plasma actuator temperature distribution along the surface of the plasma actuator during operation at about 25 KHz for a period of 7 seconds.

FIG. 8 illustrates a top view IR image of a plasma actuator temperature distribution along the surface of the plasma actuator during operation at about 25 KHz for a period of 7 seconds.

Plasma streamers with high temperatures are evident in FIGS. 6-8. The maximum temperature obtained is approximately 208 degree Celsius after 7 seconds of operation of the actuator 10 at the 25 KHz operating frequency.

FIGS. 3-8 demonstrate that one can increase the surface temperature by using the plasma actuators 10. Additionally, one can also control the temperature by adjusting the operation frequency of the plasma actuator device 10. According to one embodiment, operation frequency of the plasma actuator device 10 can be adjusted between about 5 KHz and about 30 MHz.

While only certain features of the invention have been illustrated and described herein, many modifications and changes will occur to those skilled in the art. It is therefore, to be understood that the appended claims are intended to cover all such modifications and changes as fall within the true spirit of the invention.

The invention claimed is:

1. A method of deicing a wind turbine blade, the method comprising:
    applying an active plasma actuator to a desired portion of the wind turbine blade; and
    electrically energizing the plasma actuator and controlling the operation frequency of the plasma actuator to ionize the air in the vicinity of the plasma actuator such that the surface temperature of the wind turbine blade in the vicinity of the plasma actuator is increased sufficiently to reduce or eliminate the collection of ice on the desired portion of the wind turbine blade.

2. The method according to claim 1, wherein applying an active plasma actuator to a desired portion of the wind turbine blade comprises applying an active plasma actuator tape to a desired portion of the wind turbine blade.

3. The method according to claim 2, wherein applying an active plasma actuator tape to a desired portion of the wind turbine blade comprises applying an active plasma actuator tape having a thickness of about 1 millimeter to a desired portion of the wind turbine blade.

4. The method according to claim 1, wherein applying an active plasma actuator to a desired portion of the wind turbine blade comprises embedding at least one portion of an active plasma actuator in a desired portion of the wind turbine blade.

5. The method according to claim 1, further comprising electrically energizing the plasma actuator to ionize the air in the vicinity of the plasma actuator such that air flow in the vicinity of the plasma actuator is energized with increased momentum in a near-surface region of the wind turbine blade to delay or prevent air flow separation from the near-surface region of the wind turbine blade simultaneously with the increased surface temperature of the wind turbine blade to reduce or eliminate the collection of ice.

6. A system for deicing a wind turbine blade, the system comprising:
    an active plasma actuator applied to a desired portion of the wind turbine blade;
    an electrical power supply configured to energize the plasma actuator; and
    a waveform controller configured to adjust the operation frequency of the plasma actuator such that the air in the vicinity of the plasma actuator is ionized to increase the surface temperature of the wind turbine blade in the vicinity of the plasma actuator sufficiently to reduce or eliminate the collection of ice on the desired portion of the wind turbine blade.

7. The system according to claim 6, wherein the plasma actuator is configured as a flexible tape.

8. The system according to claim 7, wherein the flexible tape plasma actuator comprises a thickness of about 1 millimeter.

9. The system according to claim 6, wherein the plasma actuator is further configured such that the surface temperature of the wind turbine blade in the vicinity of the plasma actuator is increased in response to adjusting the period of time of operation of the plasma actuator.

10. The system according to claim 6, wherein the plasma actuator is further energized by the electrical power supply such that air flow in the vicinity of the plasma actuator is energized with increased momentum in a near-surface region of the wind turbine blade to delay or prevent air flow separation from the near-surface region of the wind turbine blade simultaneously with the increased surface temperature of the wind turbine blade to reduce or eliminate the collection of ice.

11. The system according to claim 6, wherein the electrical power supply and the waveform controller together are configured to control a voltage shape, amplitude, duty cycle and frequency applied to the active plasma actuator.

12. The system according to claim 6, wherein the plasma actuator is further energized by the electrical power supply such that air flow in the vicinity of the plasma actuator is energized with increased momentum in the absence of forced air in a near-surface region of the wind turbine blade to delay or prevent air flow separation from the near-surface region of the wind turbine blade simultaneously with the increased temperature of the wind turbine blade to reduce or eliminate the collection of ice.

13. The system according to claim 6, wherein the system is devoid of external forced air resources.

14. The system according to claim 6, wherein the plasma actuator is at least partially embedded in a desired portion of the wind turbine blade.

15. The system according to claim 6, wherein the operation frequency is between about 5 KHz and about 30 MHz.

* * * * *